(12) United States Patent
Nam et al.

(10) Patent No.: US 12,375,956 B2
(45) Date of Patent: Jul. 29, 2025

(54) PDCCH MONITORING ADAPTATION AND PDCCH REPETITION

(71) Applicant: QUALCOMM Incorporated, San Diego, CA (US)

(72) Inventors: Wooseok Nam, San Diego, CA (US); Tao Luo, San Diego, CA (US); Yuchul Kim, San Diego, CA (US); Wanshi Chen, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 17/871,476

(22) Filed: Jul. 22, 2022

(65) Prior Publication Data
US 2023/0142115 A1 May 11, 2023

Related U.S. Application Data

(60) Provisional application No. 63/278,465, filed on Nov. 11, 2021.

(51) Int. Cl.
*H04W 24/08* (2009.01)
*H04L 1/00* (2006.01)
*H04L 1/1812* (2023.01)
*H04W 72/1273* (2023.01)

(52) U.S. Cl.
CPC ........... *H04W 24/08* (2013.01); *H04L 1/0038* (2013.01); *H04L 1/1812* (2013.01); *H04W 72/1273* (2013.01)

(58) Field of Classification Search
CPC .................................................... H04W 24/08
See application file for complete search history.

(56) References Cited

U.S. PATENT DOCUMENTS

| | | | |
|---|---|---|---|
| 2017/0318620 A1* | 11/2017 | Tseng | H04L 1/08 |
| 2020/0351682 A1* | 11/2020 | Cirik | H04W 76/28 |
| 2021/0360667 A1* | 11/2021 | Moon | H04L 5/0035 |
| 2021/0385826 A1* | 12/2021 | Moon | H04L 1/0046 |
| 2022/0304037 A1* | 9/2022 | Zhang | H04L 1/08 |
| 2022/0338178 A1* | 10/2022 | Kuang | H04W 52/0229 |
| 2022/0408468 A1* | 12/2022 | Jang | H04L 5/0094 |
| 2023/0180236 A1* | 6/2023 | Hu | H04L 5/0091 370/329 |
| 2023/0269742 A1* | 8/2023 | Kuang | H04W 72/1263 370/329 |
| 2024/0064763 A1* | 2/2024 | Nunome | H04L 1/0046 |
| 2024/0155636 A1* | 5/2024 | Chatterjee | H04L 27/2602 |
| 2024/0349187 A1* | 10/2024 | Lee | H04W 52/02 |

* cited by examiner

*Primary Examiner* — Guang W Li
(74) *Attorney, Agent, or Firm* — Patterson + Sheridan, L.L.P.

(57) ABSTRACT

Certain aspects of the present disclosure provide techniques for wireless communications by a network entity, comprising transmitting signaling configuring a user equipment (UE) for physical downlink control channel (PDCCH) repetition based on a set of paired PDCCH monitoring occasions (MOs), transmitting the UE downlink control information (DCI) with an indication of physical downlink control channel (PDCCH) skipping for a skip duration, and processing PDCCH transmissions in accordance with the indication based on one or more rules that account for the PDCCH repetition.

24 Claims, 11 Drawing Sheets

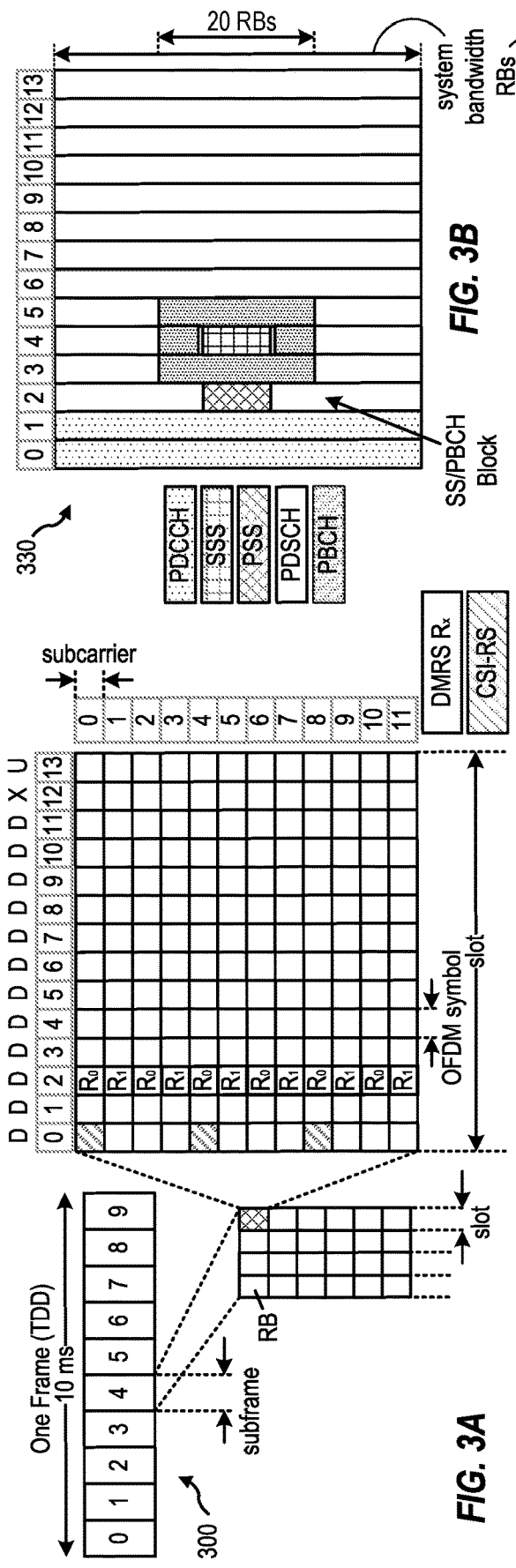
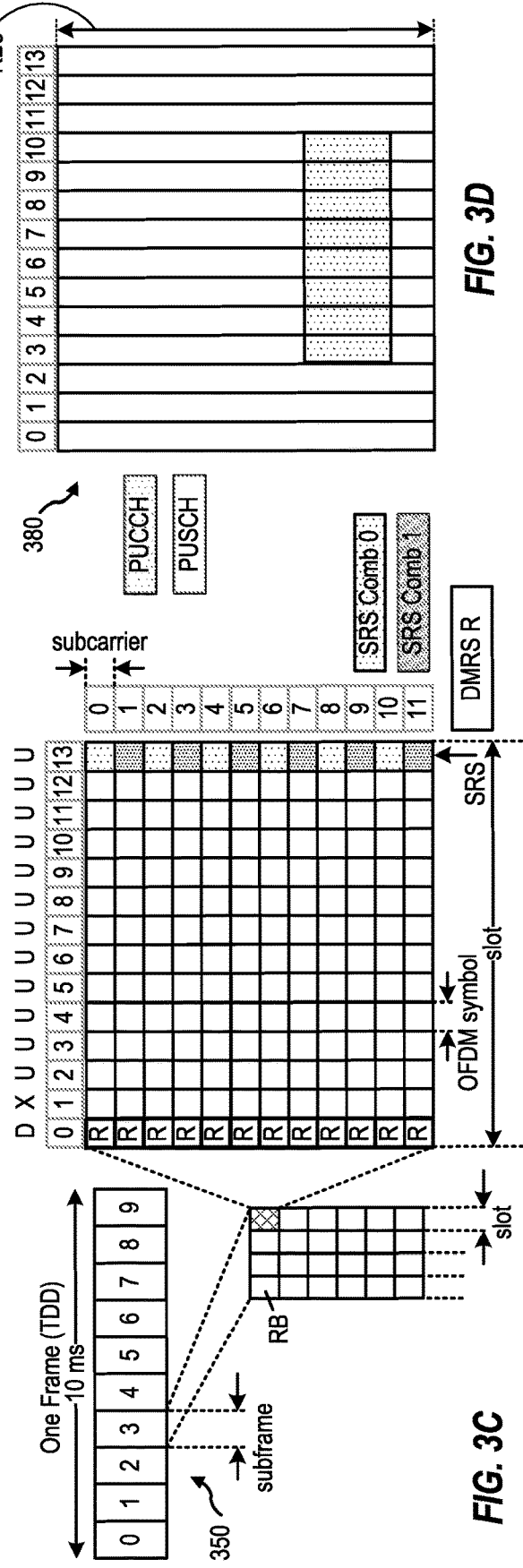

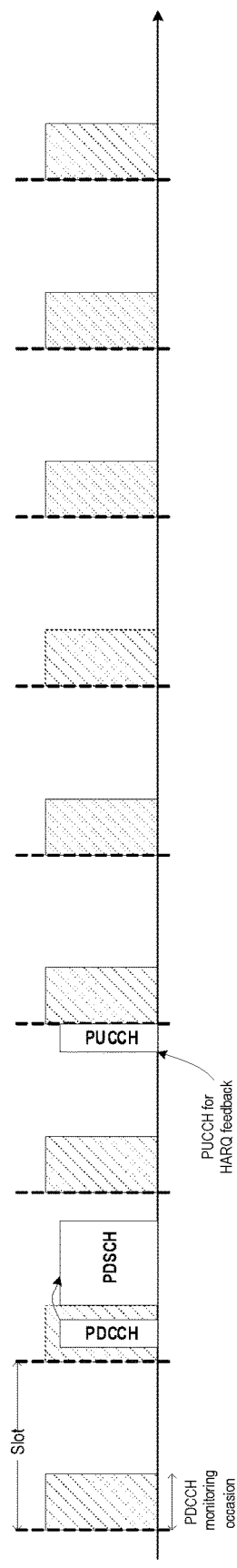 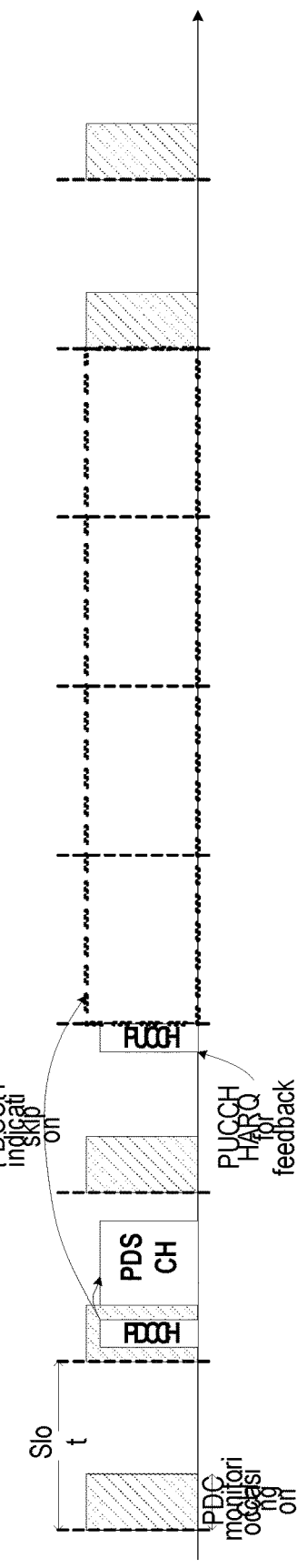
FIG. 4A
FIG. 4B

```
                                    600

┌─────────────────────────────────────────┐
           │  A METHOD FOR WIRELESS COMMUNICATIONS BY A │
           │             NETWORK ENTITY              │
           └─────────────────────────────────────────┘
                              │
                              ▼                              ─ 610
┌──────────────────────────────────────────────────────────────┐
│  TRANSMIT SIGNALING CONFIGURING A USER EQUIPMENT (UE) FOR    │
│   PHYSICAL DOWNLINK CONTROL CHANNEL (PDCCH) REPETITION       │
│  BASED ON A SET OF PAIRED PDCCH MONITORING OCCASIONS (MOS)   │
└──────────────────────────────────────────────────────────────┘
                              │
                              ▼                              ─ 620
┌──────────────────────────────────────────────────────────────┐
│  TRANSMIT THE UE DOWNLINK CONTROL INFORMATION (DCI) WITH AN  │
│   INDICATION OF PHYSICAL DOWNLINK CONTROL CHANNEL (PDCCH)    │
│              SKIPPING FOR A SKIP DURATION                    │
└──────────────────────────────────────────────────────────────┘
                              │
                              ▼                              ─ 630
┌──────────────────────────────────────────────────────────────┐
│    PROCESS PDCCH TRANSMISSIONS IN ACCORDANCE WITH THE        │
│  INDICATION BASED ON ONE OR MORE RULES THAT ACCOUNT FOR      │
│                  THE PDCCH REPETITION                        │
└──────────────────────────────────────────────────────────────┘
```

FIG. 6

900

A METHOD FOR WIRELESS COMMUNICATIONS BY A NETWORK ENTITY

910

RECEIVE SIGNALING CONFIGURING THE UE FOR PHYSICAL DOWNLINK CONTROL CHANNEL (PDCCH) REPETITION BASED ON A SET OF PAIRED PDCCH MONITORING OCCASIONS (MOS)

920

RECEIVE SIGNALING CONFIGURING THE UE FOR SEARCH SPACE (SS) SET GROUP (SSSG) SWITCHING PHYSICAL DOWNLINK CONTROL CHANNEL (PDCCH) REPETITION BASED ON A SET OF PAIRED PDCCH MOS

930

MONITOR FOR PDCCHS BASED ON ONE OR MORE RULES THAT ACCOUNT FOR THE PDCCH REPETITION AND SSSG SWITCHING

FIG. 9

PDCCH MONITORING ADAPTATION AND PDCCH REPETITION

CROSS REFERENCE TO RELATED APPLICATIONS

This application claims benefits of and priority to U.S. Provisional Patent Application No. 63/278,465, filed on Nov. 11, 2021, which is assigned to the assignee hereof and herein incorporated by reference in the entirety as if fully set forth below and for all applicable purposes.

BACKGROUND

Aspects of the present disclosure relate to wireless communications, and more particularly, to techniques for processing an indication of physical downlink control channel (PDCCH) skipping based on one or more rules that account for the PDCCH repetition.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a network entity. The method may include transmitting signaling configuring a user equipment (UE) for physical downlink control channel (PDCCH) repetition based on a set of paired PDCCH monitoring occasions (MOs). The method may include transmitting the UE downlink control information (DCI) with an indication of physical downlink control channel (PDCCH) skipping for a skip duration. The method may include processing PDCCH transmissions in accordance with the indication based on one or more rules that account for the PDCCH repetition.

One aspect provides a method for wireless communications by a user equipment (UE). The method may include receiving signaling configuring the UE for physical downlink control channel (PDCCH) repetition based on a set of paired PDCCH monitoring occasions (MOs). The method may include receiving downlink control information (DCI) with an indication of physical downlink control channel (PDCCH) skipping for a skip duration. The method may include processing the indication based on one or more rules that account for the PDCCH repetition.

One aspect provides a method for wireless communications by a network entity. The method may include transmitting signaling configuring a user equipment (UE) for physical downlink control channel (PDCCH) repetition based on a set of paired PDCCH monitoring occasions (MOs). The method may include transmitting signaling configuring the UE for search space (SS) set group (SSSG) switching. The method may include processing PDCCH transmissions in accordance with one or more rules that account for the PDCCH repetition and SSSG switching.

One aspect provides a method for wireless communications by a user equipment (UE). The method may include receiving signaling configuring the UE for physical downlink control channel (PDCCH) repetition based on a set of paired PDCCH monitoring occasions (MOs). The method may include receiving signaling configuring the UE for search space (SS) set group (SSSG) switching physical downlink control channel (PDCCH) repetition based on a set of paired PDCCH MOs. The method may include monitoring for PDCCHs based on one or more rules that account for the PDCCH repetition and SSSG switching.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 4A and FIG. 4B depict examples of physical downlink control channel (PDCCH) monitoring and monitoring adaptation, in accordance with certain aspects of the present disclosure.

FIG. 6 is a flow diagram illustrating example operations for wireless communication by a network entity, in accordance with certain aspects of the present disclosure.

FIG. 9 is a flow diagram illustrating example operations for wireless communication by a UE, in accordance with certain aspects of the present disclosure.

DETAILED DESCRIPTION

Aspects of the present disclosure provide apparatuses, methods, processing systems, and computer-readable mediums for processing physical downlink control channel (PDCCH) monitoring occasions when PDCCH repetition is configured.

In 5G/NR networks, user equipments (UEs) monitor for control signaling (e.g., uplink and downlink grants) conveyed in PDCCHs. PDCCHs are transmitted at certain times referred to as PDCCH monitoring occasions (MOs).

In many typical operational scenarios of NR modems (e.g., smart phone use cases), the process of monitoring for PDCCHs alone accounts for a significant amount of power consumption. PDCCH monitoring in this context refers to the UE monitoring for PDCCH (blind decoding of PDCCH candidates), but does not include decoding any actual scheduling grants.

In some cases, to save power, dynamic skipping of PDCCH monitoring occasions may be considered. In such cases, a UE may be signaled an indication to skip PDCCH monitoring for a certain duration of time. The indication can be transmitted with a downlink (DL) and/or uplink (UL) scheduling PDCCH for the UE. For example, a bit field in a scheduling DCI may indicate a skip duration (e.g., selected from among one or more configured values).

In some cases, it may not be entirely clear how a UE is to perform the PDCCH skipping when receiving such an indication. For example, if PDCCH repetition is enabled, multiple PDCCH MOs may be paired and the same PDCCH is repeated in the paired PDCCH MOs. In such cases, how to apply skipping to paired PDCCH MOs may present a challenge. For example, if one paired PDCCH MO is in the skip duration, but the other is not in the skip duration, it may be unclear whether to skip one or both of the paired PUCCH MOs. Issues may exist when processing PDCCH repetitions when search space (SS) set group (SSSG) is configured. For example, if only one paired PDCCH MO is in an SS set of an active SSSG but another is not, it may not be clear how to process the PDCCH repetitions.

Aspects of the present disclosure provide techniques that may help address base station (e.g., gNB) and UE behavior when PDCCH repetition is configured along with PDCCH skipping. Aspects of the present disclosure also provide techniques that may help address base station (e.g., gNB) and UE behavior when PDCCH repetition is configured along with SSSG switching.

Introduction to Wireless Communication Networks

Figure 1:
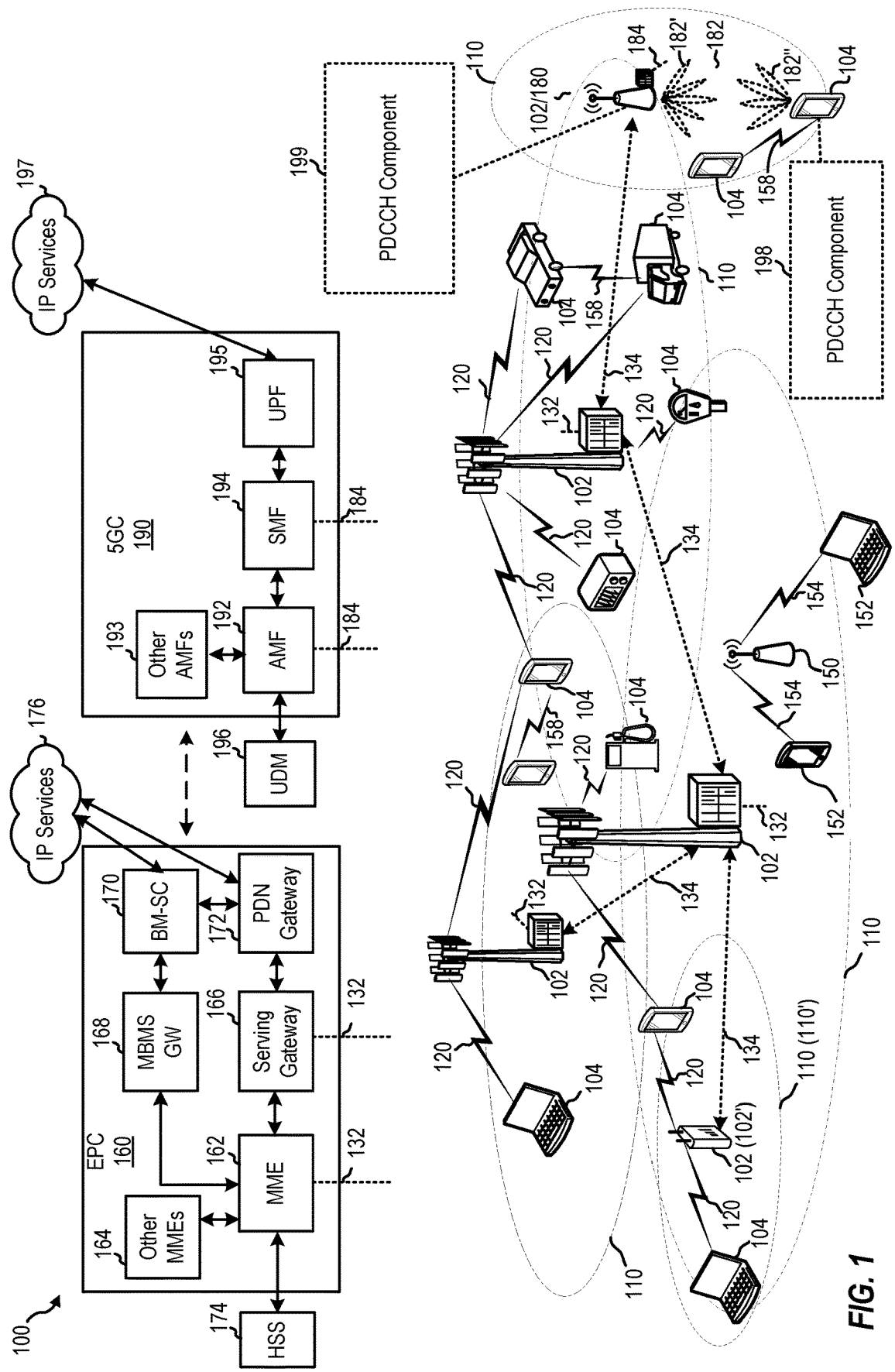
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs. For example, one or more of the UEs may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs and UE-specific search space sets for sending control information to a specific UE.

Wireless communication network 100 includes PDCCH component 199, which may be configured to process PDCCH transmissions. Wireless network 100 further includes PDCCH component 198, which may be used configured to monitor for PDCCH transmissions.

Figure 2:
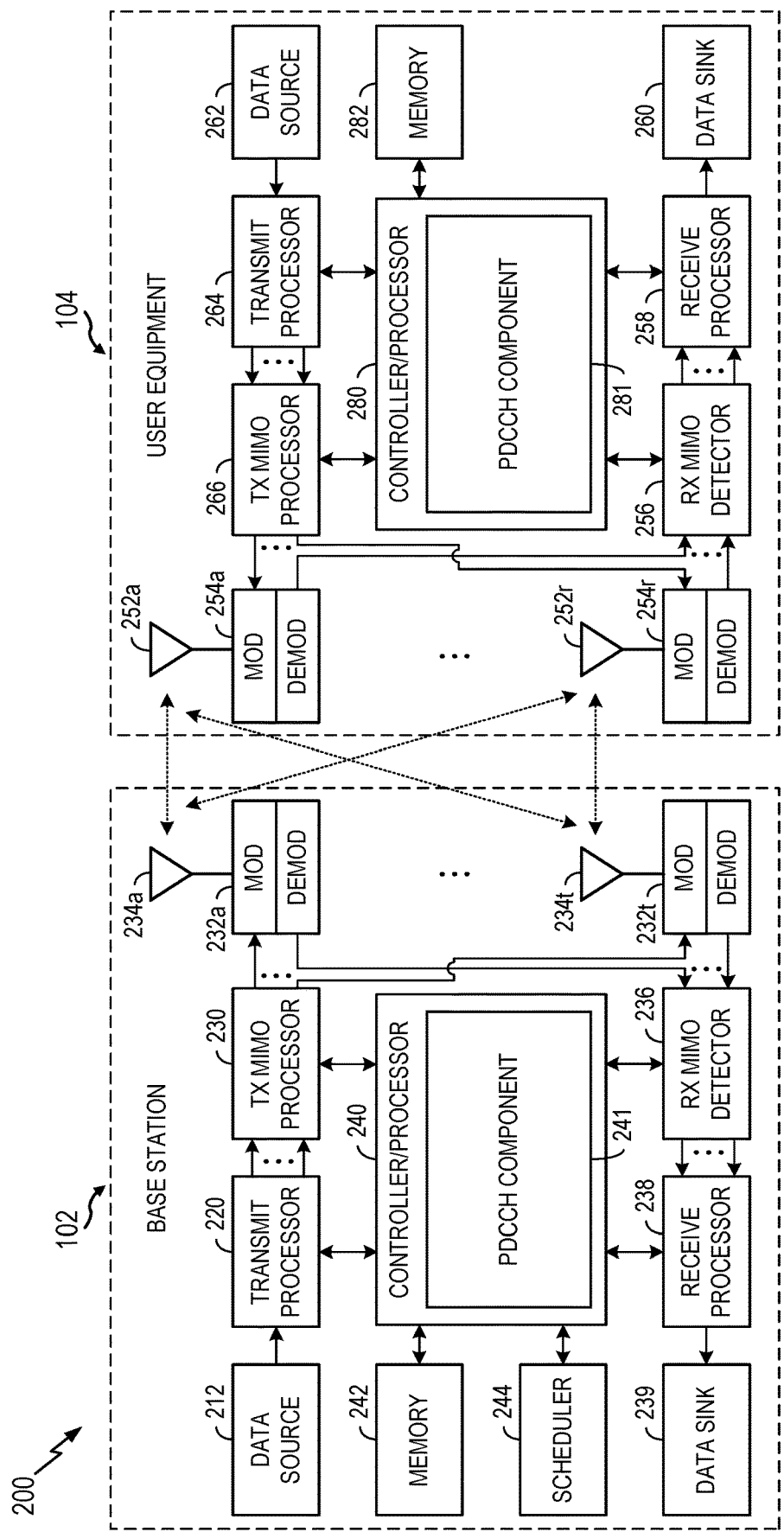
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes PDCCH component 241, which may be representative of PDCCH component 199 of FIG. 1. Notably, while depicted as an aspect of controller/processor 240, PDCCH component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes PDCCH component 281, which may be representative of PDCCH component 198 of FIG. 1. Notably, while depicted as an aspect of controller/processor 280, PDCCH component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Aspects Related to PDCCH Monitoring

Aspects of the present disclosure provide apparatuses, methods, processing systems, and computer-readable mediums for processing physical downlink control channel (PDCCH) monitoring occasions when PDCCH repetition is configured.

In 5G/NR networks, user equipments (UEs) monitor for control signaling (e.g., uplink and downlink grants) conveyed in PDCCHs. PDCCHs are transmitted at certain times referred to as PDCCH monitoring occasions (MOs).

FIG. 4A illustrates an example of PDCCH MOs. As illustrated, a PDCCH MO may occur at the beginning of a slot. If the UE is in a low power state, such as a discontinuous reception (DRX) state with some RF resources powered down, the UE typically wakes up (e.g., in a DRX ON duration) from the low power state to monitor for PDCCH transmissions sent in the PDCCH MOs. If a PDCCH is not detected, the UE may go back to sleep (e.g., a DRX Off duration).

In the illustrated example, a PDCCH is transmitted in the second slot. The PDCCH schedules a downlink transmission (PDSCH). The UE then sends acknowledgment (ACK) feedback (indicating whether the scheduled PDSCH was successfully received or not) in a physical uplink control channel (PUCCH).

As indicated above, in many typical operational scenarios of NR modems (e.g., smart phone use cases), the process of monitoring for PDCCHs alone accounts for a significant amount of power consumption. Therefore, in some cases, to save power, dynamic skipping of PDCCH monitoring occasions may be considered.

FIG. 4B illustrates an example of PDCCH monitoring with skipping. The UE may be signaled an indication to skip PDCCH monitoring for a certain duration of time. In the illustrated example, the indication is transmitted with the PDCCH scheduling a PDSCH. For example, a bit field in a scheduling downlink control information (DCI) conveyed in the PDCCH may indicate a skip duration. As illustrated, the skip duration may begin after the PUCCH carrying ACK feedback for the PDSCH.

As noted above, a scheduling DCI (e.g., format 0_1/0_2/1_1/1_2) may indicate PDCCH skipping along with PDSCH/PUSCH scheduling. In some cases, a field (e.g., up to 2-bit field) may be configured in a scheduling DCI for the indication. The skip duration may be indicated in different granularities. For example, the skip duration may indicate the UE is to skip PDCCH monitoring for the next N slots, for the next N PDCCH MOs, or until the start of a next DRX cycle.

For various applications, such as deployments with multiple transmitter receiver points (multi-TRP), PDCCH repetition may be configured to enhance reliability. In such cases, at least two PDCCH MOs (possibly associated with different SS sets and CORESETs) may be paired for the PDCCH repetitions.

Figures 5A, 5B:
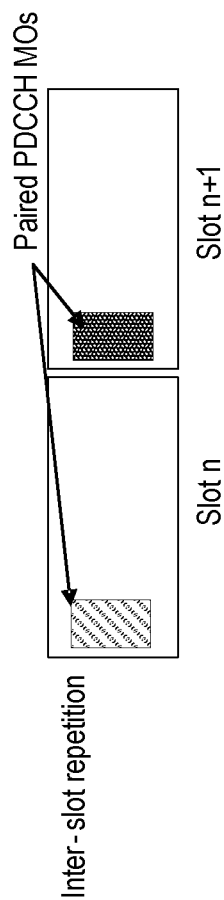
FIG. 5A and FIG. 5B depict examples of PDCCH repetition, in accordance with certain aspects of the present disclosure.

In such cases, as illustrated in FIGS. 5A and 5B a same PDCCH is repeated on the paired PDCCH MOs and mapped to the same CCE indices of the two MOs. This may allow the UE to combine the repeated PDCCHs before attempting decoding, which may improve reliability. PDCCH repetition may occur across slots (inter-slot) as shown in FIG. 5A or within a slot (intra-slot) as shown in FIG. 5B.

As noted above, it may not always be entirely clear how a UE is to perform the PDCCH skipping when receiving such an indication. For example, if PDCCH repetition is enabled, multiple PDCCH MOs may be paired and the same PDCCH is repeated in the paired PDCCH MOs. In such cases, how to apply skipping to paired PDCCH MOs may present a challenge. For example, if one paired PDCCH MO is in the skip duration, but the other is not in the skip duration, it may be unclear whether to skip one or both of the paired PUCCH MOs.

Aspects of the present disclosure provide techniques that may help address base station (e.g., gNB) and UE behavior when PDCCH repetition is configured along with PDCCH skipping. For example, in some cases, when PDCCH repetition and skipping are both (jointly) configured, one or more rules may be applied that determine if and when PDCCH MOs should be skipped. This defined behavior may allow a BS to know what PDCCH MOs a UE is actually monitoring and avoid transmitting PDCCHs on these.

The techniques may help determine, when PDCCH skipping and PDCCH repetition are jointly configured, if or when only one of a set of paired PDCCH MOs should be skipped. The techniques may help define UE and base station behavior in various cases. For example, the techniques may apply to a first case of inter-slot PDCCH repetition (as shown in FIG. 5A) with slot-level PDCCH skipping granularity. The techniques may also apply to a second case of intra-slot PDCCH repetition (as shown in FIG. 5B) with MO-level PDCCH skip granularity (or any granularity finer than slot, such as a sub-slot).

In some cases, the rules proposed herein may help define the PDCCH skipping indication timeline (e.g., when an indicated skip duration should begin). In some cases, if a pair of repeated PDCCHs is used to indicate PDCCH skipping, the skipping may be applied (the skip duration may start) after the later PDCCH MO of the pair. In other words, application time, if any, may be counted from the end of the later PDCCH MO.

Various other rules may also be applied (additionally or alternatively) to determine if or how PDCCH skipping is to be applied when PDCCH repetition is configured.

For example, in some cases, joint configuration of PDCCH skipping and PDCCH repetition may not be allowed. In such cases, the UE may treat such a joint configuration as invalid.

In some cases, if two (or more) PDCCH MOs are paired for repetition, these PDCCH MOs may always skipped together. In some cases, if at least one of the paired PDCCH MOs is contained in the indicated skip duration, both PDCCH MOs may be skipped (e.g., not monitored as the UE stays in/returns to a low power state).

In some cases, each of the paired PDCCH MOs may be individually skipped. In such cases, if only one of the paired PDCCH MOs is skipped, the remaining PDCCH MO is monitored without repetition. In some cases, other functions, such as overbooking, blind decode (BD)/control channel element (CCE) counting, and scheduling/HARQ timelines may not be affected by the dynamic PDCCH skipping. For example, conventional repetition timelines may be followed, as if neither of the PDCCH MOs are skipped.

As noted above, issues may also exist when processing PDCCH repetitions when search space (SS) set group (SSSG) is configured. For example, when SSSG switching and PDCCH repetition are jointly configured, SS sets for the two paired PDCCH MOs may or may not be active at the same time. As an example, in SSSG #0, both (assuming two) paired SS sets (e.g., SS set #1 and SS set #2) may be included. On the other hand, in SSSG #1, only SS set #1 may be included.

Aspects of the present disclosure provide various rules that may help define the BS and UE behaviors in such cases of joint operation of SSSG switching with PDCCH repetition.

According to one rule, joint configuration of SSSG switching and PDCCH repetition may not be allowed. In such cases, the UE may treat such a joint configuration as invalid.

In some cases, if jointly configured, PDCCH repetition may be restricted such that the two paired SS sets are always included (or always not included) in an SSSG together. In the example above, SSSG #0 would be considered a valid configuration, while SSSG #1 would be considered an invalid configuration.

In some cases, dynamic selection of PDCCH repetition or no repetition may be based on an active SSSG. For example, if two SS sets are in the same SSSG, PDCCH repetition may be applied while that SSSG is active.

In the example above, if the UE monitors PDCCH according to SSSG #0, PDCCH repetition can be applied over SS sets #1 and #2. If only one SS set is in an SSSG, only single PDCCH monitoring is applied while that SSSG is active. In the example above, if UE monitors PDCCH according to SSSG #1, PDCCH repetition may be disabled. In some cases, other functions, such as overbooking, blind decode (BD)/control channel element (CCE) counting, and scheduling/HARQ timelines may be affected by SSSG switching. For example, overbooking and BD/CCE counting timelines may be different for single PDCCH monitoring than for monitoring for PDCCH with repetition.

Example Methods

FIG. 6 illustrates example operations 600 for wireless communication by a network entity. The operations 600 may be performed, for example, by a BS (e.g., such as a BS 102 in the wireless communication network 100) to processing an indication of physical downlink control channel (PDCCH) skipping based on one or more rules that account for the PDCCH repetition.

At 610, a network entity transmits signaling configuring a user equipment (UE) for physical downlink control channel (PDCCH) repetition based on a set of paired PDCCH monitoring occasions (MOs).

At 620, a network entity transmits the UE downlink control information (DCI) with an indication of physical downlink control channel (PDCCH) skipping for a skip duration.

At 630, a network entity processes PDCCH transmissions in accordance with the indication based on one or more rules that account for the PDCCH repetition.

Figure 7:
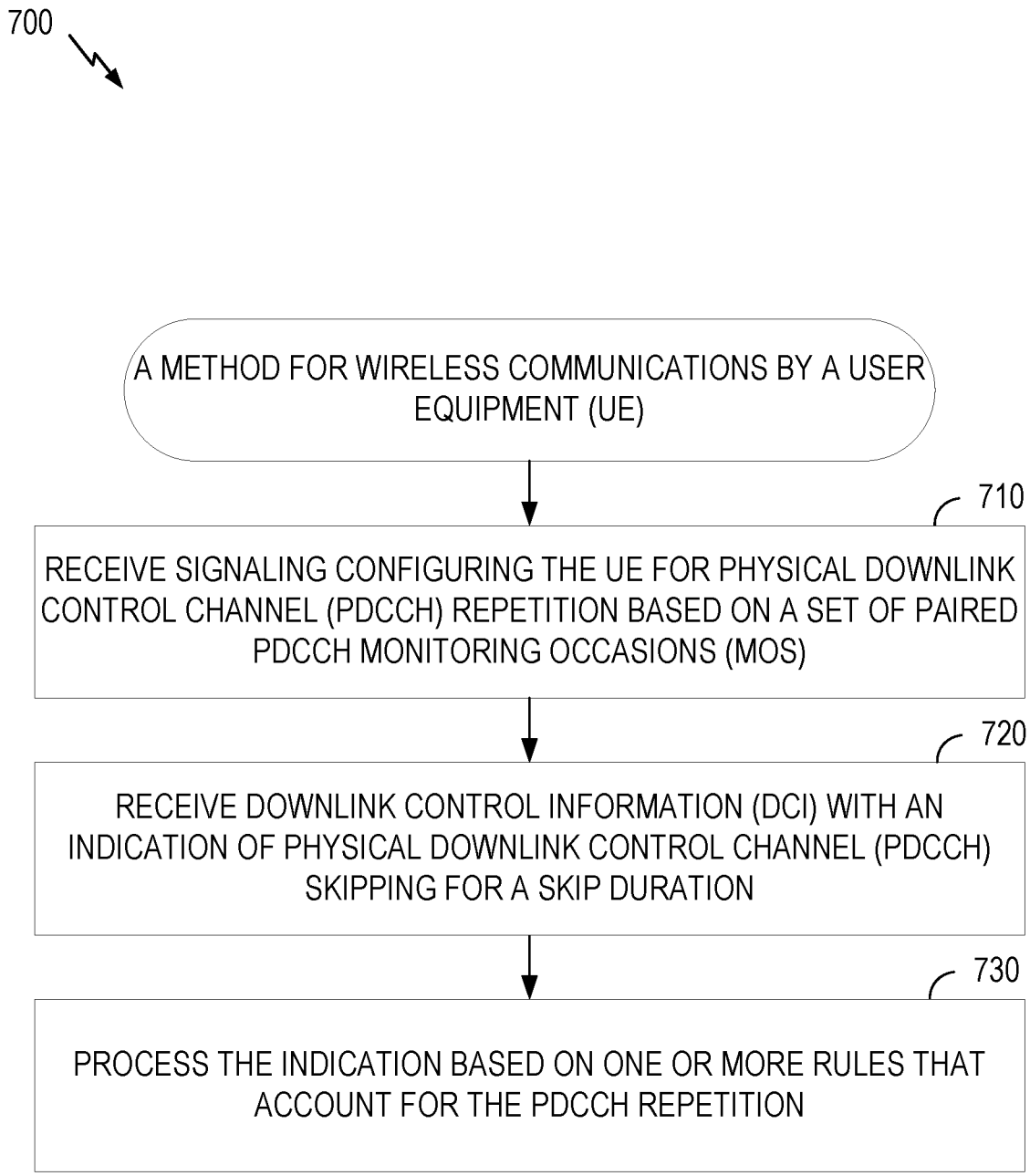
FIG. 7 is a flow diagram illustrating example operations for wireless communication by a UE, in accordance with certain aspects of the present disclosure.

FIG. 7 illustrates example operations 700 for wireless communication by a UE. The operations 700 may be performed, for example, by a UE (e.g., such as a UE 104 in the wireless communication network 100) for processing an indication of physical downlink control channel (PDCCH) skipping based on one or more rules that account for the PDCCH repetition.

At 710, a UE receives signaling configuring the UE for physical downlink control channel (PDCCH) repetition based on a set of paired PDCCH MOs.

At 720, a UE receives downlink control information (DCI) with an indication of PDCCH skipping for a skip duration.

At 730, a UE processes the indication based on one or more rules that account for the PDCCH repetition.

Figure 8:
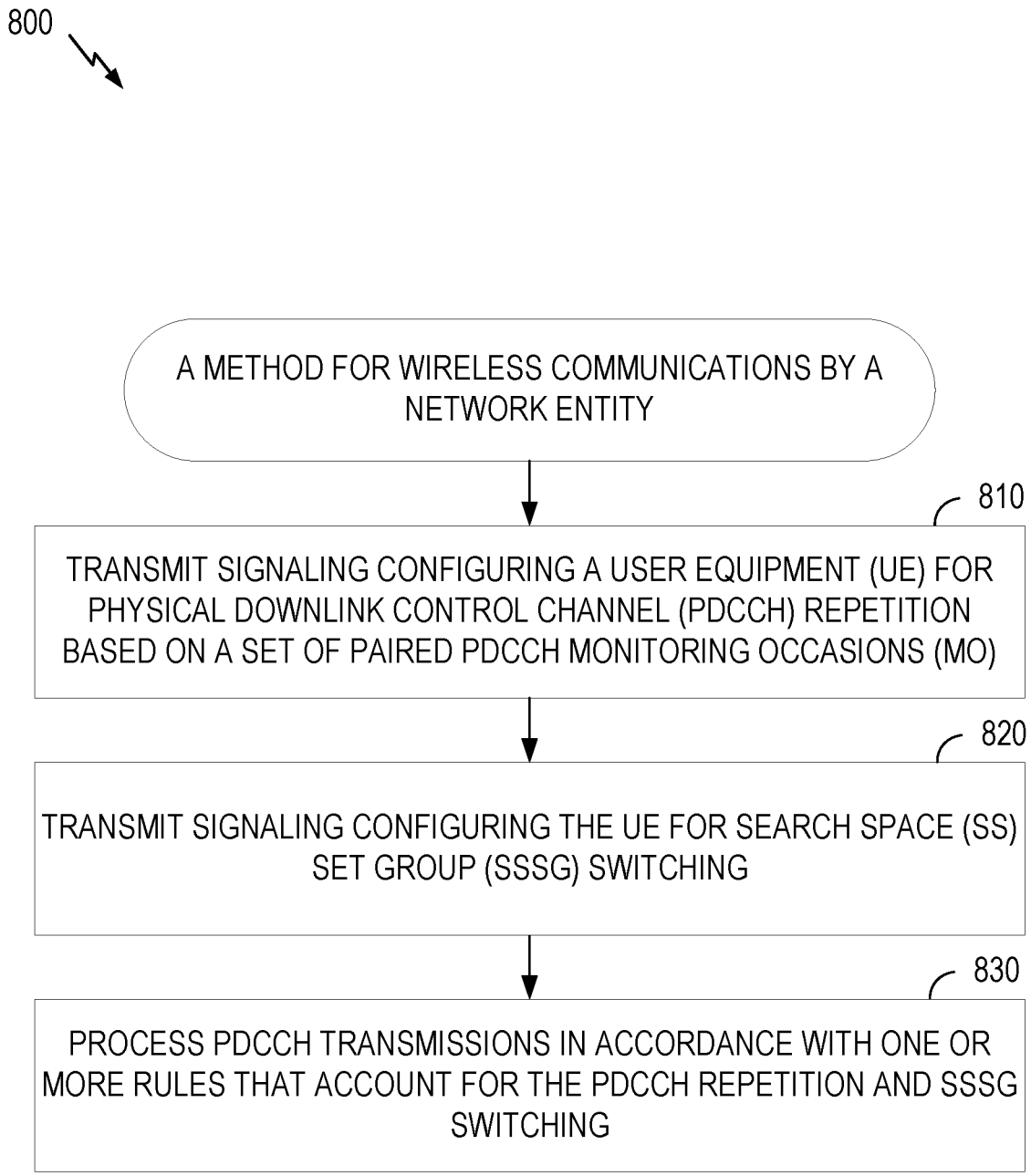
FIG. 8 is a flow diagram illustrating example operations for wireless communication by a network entity, in accordance with certain aspects of the present disclosure.

FIG. 8 illustrates example operations 800 for wireless communication by a network entity. The operations 800 may be performed, for example, by a base station (e.g., such as a BS 102 in the wireless communication network 100) to processing an indication of physical downlink control channel (PDCCH) skipping based on one or more rules that account for the PDCCH repetition.

At 810, a network entity transmits signaling configuring a UE for PDCCH repetition based on a set of paired PDCCH MOs.

At 820, a network entity transmits signaling configuring the UE for search space (SS) set group (SSSG) switching.

At 830, a network entity processes PDCCH transmissions in accordance with one or more rules that account for the PDCCH repetition and SSSG switching.

FIG. 9 illustrates example operations 900 for wireless communication by a UE. The operations 900 may be performed, for example, by a UE (e.g., such as a UE 104 in the wireless communication network 100) to processing an indication of physical downlink control channel (PDCCH) skipping based on one or more rules that account for the PDCCH repetition.

At 910, a UE receives signaling configuring the UE for PDCCH repetition based on a set of paired PDCCH MOs.

At 920, a UE receives signaling configuring the UE for SS set group SSSG switching PDCCH repetition based on a set of paired PDCCH MOs.

Figure 10:
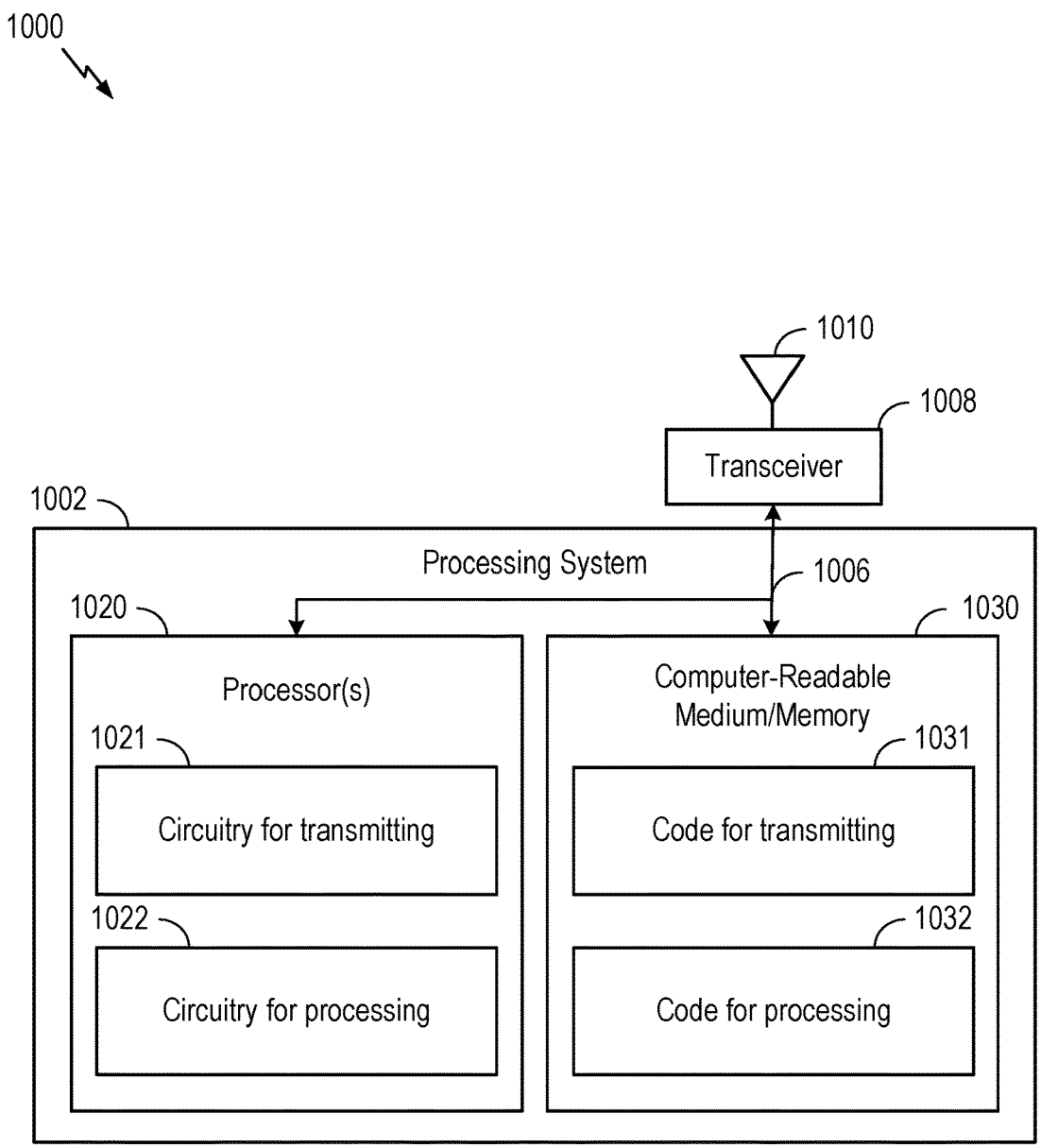
FIG. 10 depicts aspects of an example communications device.

At 930, a UE monitors for PDCCHs based on one or more rules that account for the PDCCH repetition and SSSG switching Example Wireless Communication Devices FIG. 10 depicts an example communications device 1000 that includes various components operable, configured, or adapted to perform operations for the techniques disclosed herein, such as the operations depicted and described with respect to FIGS. 6 & 8. In some examples, communication device 1000 may be a base station 102 as described, for example with respect to FIGS. 1 and 2.

Communications device 1000 includes a processing system 1002 coupled to a transceiver 108 (e.g., a transmitter and/or a receiver). Transceiver 108 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 106. In certain aspects, computer-readable medium/memory 1030 is configured to store instructions (e.g., computer-executable code) that when executed by the one or more processors 1020, cause the one or more processors 1020 to perform the operations illustrated in FIGS. 6 & 8, or other operations for performing the various techniques discussed herein for process PDCCH transmissions.

In the depicted example, computer-readable medium/memory 1030 stores code 1031 for transmitting and code 1032 for processing.

In the depicted example, the one or more processors 1020 include circuitry configured to implement the code stored in the computer-readable medium/memory 1030, including circuitry 1021 for transmitting and circuitry 1022 for processing.

Various components of communications device 1000 may provide means for performing the methods described herein, including with respect to FIGS. 6 & 8.

In some examples, means for transmitting or sending (or means for outputting for transmission) may include the transceivers 232 and/or antenna(s) 234 of the base station 102 illustrated in FIG. 2 and/or transceiver 108 and antenna 1010 of the communication device 1000 in FIG. 10.

In some examples, means for receiving (or means for obtaining) may include the transceivers 232 and/or antenna(s) 234 of the base station illustrated in FIG. 2 and/or transceiver 108 and antenna 1010 of the communication device 1000 in FIG. 10.

In some examples, means for transmitting and/or processing may include various processing system components, such as: the one or more processors 1020 in FIG. 10, or aspects of the base station 102 depicted in FIG. 2, including receive processor 238, transmit processor 220, TX MIMO processor 230, and/or controller/processor 240 (including PDCCH component 241).

Notably, FIG. 10 is an example, and many other examples and configurations of communication device 1000 are possible.

Figure 11:
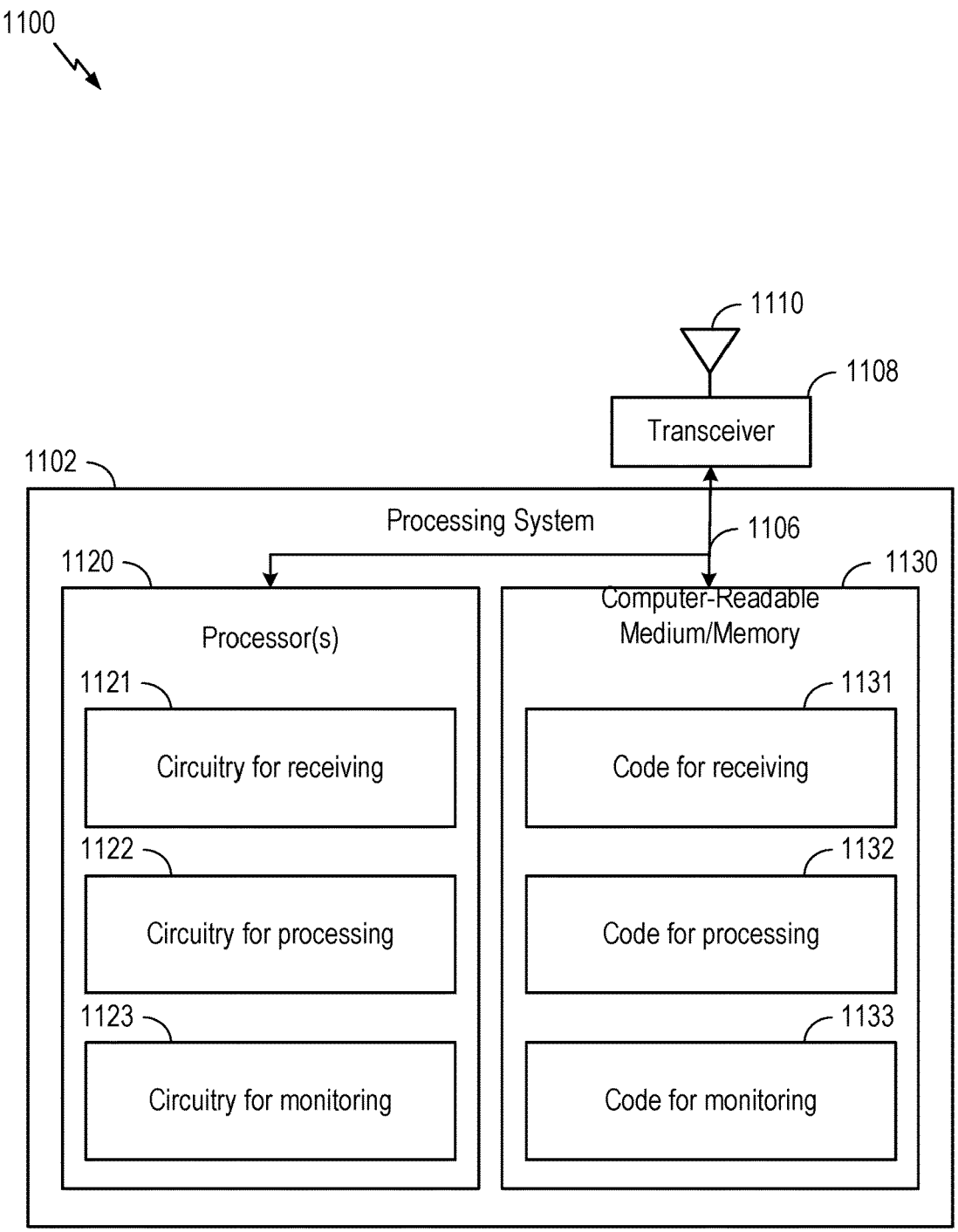
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 7 & 9. In some examples, communication device 1100 may be a user equipment 104 as described, for example with respect to FIGS. 1 and 2.

Communications device 1100 includes a processing system 112 coupled to a transceiver 118 (e.g., a transmitter and/or a receiver). Transceiver 118 is configured to transmit (or send) and receive signals for the communications device 1100 via an antenna 1110, such as the various signals as described herein. Processing system 112 may be configured to perform processing functions for communications device 1100, including processing signals received and/or to be transmitted by communications device 1100.

Processing system 112 includes one or more processors 1120 coupled to a computer-readable medium/memory 1130 via a bus 116. In certain aspects, computer-readable medium/memory 1130 is configured to store instructions (e.g., computer-executable code) that when executed by the one or more processors 1120, cause the one or more processors 1120 to perform the operations illustrated in FIGS. 7 & 9, or other operations for performing the various techniques discussed herein for monitor for PDCCH transmissions.

In the depicted example, computer-readable medium/memory 1130 stores code 1131 for receiving, code 1132 for processing, and code 1133 for monitoring.

In the depicted example, the one or more processors 1120 include circuitry configured to implement the code stored in the computer-readable medium/memory 1130, including circuitry 1121 for receiving, circuitry 1122 for processing, and circuitry 1123 for monitoring.

Various components of communications device 1100 may provide means for performing the methods described herein, including with respect to FIGS. 7 & 9.

In some examples, means for transmitting or sending (or means for outputting for transmission) may include the transceivers 254 and/or antenna(s) 252 of the user equipment 104 illustrated in FIG. 2 and/or transceiver 118 and antenna 1110 of the communication device 1100 in FIG. 11.

In some examples, means for receiving (or means for obtaining) may include the transceivers 254 and/or antenna(s) 252 of the user equipment 104 illustrated in FIG. 2 and/or transceiver 118 and antenna 1110 of the communication device 1100 in FIG. 11.

In some examples, means for receiving, processing, and/or monitoring may include various processing system components, such as: the one or more processors 1120 in FIG. 11, or aspects of the user equipment 104 depicted in FIG. 2, including receive processor 258, transmit processor 264, TX MIMO processor 266, and/or controller/processor 280 (including PDCCH component 281).

Notably, FIG. 11 is an example, and many other examples and configurations of communication device 1100 are possible.

EXAMPLE CLAUSES

Implementation examples are described in the following numbered clauses:

Clause 1: A method for wireless communications by a user equipment (UE), comprising: receiving signaling configuring the UE for physical downlink control channel (PDCCH) repetition based on a set of paired PDCCH monitoring occasions (MOs), receiving downlink control information (DCI) with an indication of physical downlink control channel (PDCCH) skipping for a skip duration, and processing the indication based on one or more rules that account for the PDCCH repetition.

Clause 2: The method of Clause 1, wherein: the DCI with the indication is conveyed in a pair of repeated PDCCHs; and one of the rules dictates that the skip duration is applied at an end of a PDCCH MO for a later of the repeated PDCCHs.

Clause 3: The method of any one of Clauses 1-2, wherein: one of the rules dictates that the indication of PDCCH skipping is ignored when PDCCH repetition is configured.

Clause 4: The method of any one of Clauses 1-3, wherein: one of the rules dictates that, if at least one of a set of paired PDCCH MOs is contained within the skip duration, all PDCCH MOs in the set of paired PDCCH MOs is skipped.

Clause 5: The method of any one of Clauses 1-4, wherein: one of the rules dictates that, if only a first subset of paired PDCCH MOs is contained within the skip duration, the first subset of paired PDCCH MOs is skipped and a second subset of the paired PDCCH MOs outside the skip duration is monitored.

Clause 6: The method of Clause 5, wherein one of the rules also dictates that at least one of overbooking, blind decoding counting, control channel element counting, a scheduling timeline, or hybrid automatic repeat request (HARM) timeline is unaffected by skipping the first subset of paired PDCCH MOs.

Clause 7: A method for wireless communications by a network entity, comprising: transmitting signaling configuring a user equipment (UE) for physical downlink control channel (PDCCH) repetition based on a set of paired PDCCH monitoring occasions (MOs); transmitting the UE downlink control information (DCI) with an indication of physical downlink control channel (PDCCH) skipping for a skip duration; and processing PDCCH transmissions in accordance with the indication based on one or more rules that account for the PDCCH repetition.

Clause 8: The method of Clause 7, wherein: the DCI with the indication is conveyed in a pair of repeated PDCCHs; and one of the rules dictates that the skip duration is applied at an end of a PDCCH MO for a later of the repeated PDCCHs.

Clause 9: The method of any of Clauses 7-8, wherein: one of the rules dictates that the indication of PDCCH skipping is ignored when PDCCH repetition is configured.

Clause 10: The method of any of Clauses 7-9, wherein: one of the rules dictates that, if at least one of a set of paired PDCCH MOs is contained within the skip duration, all PDCCH MOs in the set of paired PDCCH MOs is skipped.

Clause 11: The method of any of Clauses 7-10, wherein: one of the rules dictates that, if only a first subset of paired PDCCH MOs is contained within the skip duration, the first subset of paired PDCCH MOs is skipped and a second subset of the paired PDCCH MOs outside the skip duration is monitored.

Clause 12: The method of Clause 11, wherein one of the rules also dictates that at least one of overbooking, blind decoding counting, control channel element counting, a scheduling timeline, or hybrid automatic repeat request (HARM) timeline is unaffected by skipping the first subset of paired PDCCH MOs.

Clause 13: A method for wireless communications by a user equipment (UE), comprising: receiving signaling configuring the UE for physical downlink control channel (PDCCH) repetition based on a set of paired PDCCH monitoring occasions (MOs); receiving signaling configuring the UE for search space (SS) set group (SSSG) switching physical downlink control channel (PDCCH) repetition based on a set of paired PDCCH MOs; monitoring for PDCCHs based on one or more rules that account for the PDCCH repetition and SSSG switching.

Clause 14: The method of Clause 13, wherein: one of the rules dictates that joint configuration of PDCCH repetition and SSSG switching is treated as an invalid configuration.

Clause 15: The method of any one of Clauses 13-14, wherein: one of the rules dictates that paired SS sets of paired PDCCH MOs are to be included in a same SSSG together.

Clause 16: The method of Clause 15, wherein a configuration in which paired SS sets of paired PDCCH MOs are not included in a same SSSG together is treated as an invalid configuration.

Clause 17: The method of any one of Clauses 13-16, wherein: one of the rules dictates that whether PDCCH repetition is applied depends, at least in part, on an active SSSG.

Clause 18: The method of Clause 17, wherein if two SS sets of paired PDCCH MOs are in a same SSSG, PDCCH repetition is applied while that SSSG is active.

Clause 19: The method of Clause 17, wherein if only one SS set of paired PDCCH MOs are in a same SSSG, the UE applies only single PDCCH monitoring while that SSSG is active.

Clause 20: The method of Clause 17, wherein another one of the rules dictates that at least one of overbooking, blind decoding counting, control channel element counting, a scheduling timeline, or hybrid automatic repeat request (HARM) timeline depends, at least in part, on whether the UE monitors for single PDCCH or PDCCH with repetition in an active SSSG.

Clause 21: A method for wireless communications by a network entity, comprising: transmitting signaling configuring a user equipment (UE) for physical downlink control channel (PDCCH) repetition based on a set of paired PDCCH monitoring occasions (MOs); transmitting signaling configuring the UE for search space (SS) set group (SSSG) switching; and processing PDCCH transmissions in accordance with one or more rules that account for the PDCCH repetition and SSSG switching.

Clause 22: The method of Clause 21, wherein: one of the rules dictates that joint configuration of PDCCH repetition and SSSG switching is treated as an invalid configuration.

Clause 23: The method of any of Clauses 21-22, wherein: one of the rules dictates that paired SS sets of paired PDCCH MOs are to be included in a same SSSG together.

Clause 24: The method of Clause 23, wherein a configuration in which paired SS sets of paired PDCCH MOs are not included in a same SSSG together is treated as an invalid configuration.

Clause 25: The method of any of Clauses 21-24, wherein: one of the rules dictates that whether PDCCH repetition is applied depends, at least in part, on an active SSSG.

Clause 26: The method of Clause 25, wherein if two SS sets of paired PDCCH MOs are in a same SSSG, PDCCH repetition is applied while that SSSG is active.

Clause 27: The method of Clause 25, wherein if only one SS set of paired PDCCH MOs are in a same SSSG, the UE applies only single PDCCH monitoring while that SSSG is active.

Clause 28: The method of Clause 25, wherein another one of the rules dictates that at least one of overbooking, blind decoding counting, control channel element counting, a scheduling timeline, or hybrid automatic repeat request (HARD) timeline depends, at least in part, on whether the UE monitors for single PDCCH or PDCCH with repetition in an active SSSG.

Clause 29: An apparatus, comprising: a memory comprising executable instructions; one or more processors configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of processing an indication of physical downlink control channel (PDCCH) skipping based on one or more rules that account for the PDCCH repetition in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising: a memory comprising computer-executable instructions; and one or more processors configured to execute the computer-executable instructions and cause the UE to:
receive signaling configuring the UE for physical downlink control channel (PDCCH) repetition based on a set of paired PDCCH monitoring occasions (MOs);
receive signaling configuring the UE for search space (SS) set group (SSSG) switching physical downlink control channel (PDCCH) repetition based on a set of paired PDCCH MOs; and
monitor for PDCCHs based on one or more rules that account for the PDCCH repetition and SSSG switching, wherein one of the one or more rules dictates that whether the PDCCH repetition is applied depends, at least in part, on an active SSSG;
determine two SS sets of paired PDCCH MOs are in a same SSSG; and
apply, based on the determining, the PDCCH repetition while the same SSSG is active.

2. The apparatus of claim 1, wherein:
one of the rules dictates that paired SS sets of paired PDCCH MOs are to be included in a same SSSG together.

3. The apparatus of claim 2, wherein a configuration in which paired SS sets of paired PDCCH MOs are not included in a same SSSG together is treated as an invalid configuration.

4. The apparatus of claim 1, wherein:
in response to determining only one SS set of paired PDCCH MOs are in a same SSSG, the UE applies only single PDCCH monitoring while that SSSG is active.

5. The apparatus of claim 1, wherein another one of the one or more rules dictates that at least one of overbooking, blind decoding counting, control channel element counting, a scheduling timeline, or hybrid automatic repeat request (HARQ) timeline depends, at least in part, on whether the UE monitors for single PDCCH or PDCCH with repetition in an active SSSG.

6. The apparatus of claim 1, wherein:
one of the rules dictates that joint configuration of PDCCH repetition and SSSG switching is treated as an invalid configuration.

7. An apparatus for wireless communications at a network entity, comprising: a memory comprising computer-executable instructions; and one or more processors configured to execute the computer-executable instructions and cause the network entity to:
transmit signaling configuring a user equipment (UE) for physical downlink control channel (PDCCH) repetition based on a set of paired PDCCH monitoring occasions (MOs);
transmit signaling configuring the UE for search space (SS) set group (SSSG) switching; and
process PDCCH transmissions in accordance with one or more rules that account for the PDCCH repetition and SSSG switching, wherein one of the one or more rules dictates that whether the PDCCH repetition is applied depends, at least in part, on an active SSSG, wherein in response to two SS sets of paired PDCCH MOs being in a same SSSG, the PDCCH repetition is applied while the same SSSG is active.

8. The apparatus of claim 7, wherein:
one of the rules dictates that paired SS sets of paired PDCCH MOs are to be included in the same SSSG together.

9. The apparatus of claim 8, wherein a configuration in which paired SS sets of paired PDCCH MOs are not included in a same SSSG together is treated as an invalid configuration.

10. The apparatus of claim 7, wherein:
in response to determining only one SS set of paired PDCCH MOs are in a same SSSG, the UE applies only single PDCCH monitoring while that SSSG is active.

11. The apparatus of claim 7, wherein another one of the rules dictates that at least one of overbooking, blind decoding counting, control channel element counting, a scheduling timeline, or hybrid automatic repeat request (HARQ) timeline depends, at least in part, on whether the UE monitors for single PDCCH or PDCCH with repetition in an active SSSG.

12. The apparatus of claim 7, wherein:
one of the rules dictates that joint configuration of PDCCH repetition and SSSG switching is treated as an invalid configuration.

13. A method for wireless communications by a user equipment (UE), comprising:
receiving signaling configuring the UE for physical downlink control channel (PDCCH) repetition based on a set of paired PDCCH monitoring occasions (MOs);
receiving signaling configuring the UE for search space (SS) set group (SSSG) switching physical downlink control channel (PDCCH) repetition based on a set of paired PDCCH MOs; and
monitoring for PDCCHs based on one or more rules that account for the PDCCH repetition and SSSG switching;
determining two SS sets of paired PDCCH MOs are in a same SSSG; and
applying, based on the determining, the PDCCH repetition while the same SSSG is active.

14. The method of claim 13, wherein:
one of the rules dictates that paired SS sets of paired PDCCH MOs are to be included in a same SSSG together.

15. The method of claim 14, wherein a configuration in which paired SS sets of paired PDCCH MOs are not included in a same SSSG together is treated as an invalid configuration.

16. The method of claim 13, wherein:
one of the rules dictates that whether PDCCH repetition is applied depends, at least in part, on an active SSSG.

17. The method of claim 16, wherein another one of the rules dictates that at least one of overbooking, blind decoding counting, control channel element counting, a scheduling timeline, or hybrid automatic repeat request (HARQ) timeline depends, at least in part, on whether the UE monitors for single PDCCH or PDCCH with repetition in an active SSSG.

18. The method of claim 13, wherein:
in response to determining only one SS set of paired PDCCH MOs are in a same SSSG, the UE applies only single PDCCH monitoring while that SSSG is active.

19. A method for wireless communications by a network entity, comprising:
transmitting signaling configuring a user equipment (UE) for physical downlink control channel (PDCCH) repetition based on a set of paired PDCCH monitoring occasions (MOs);
transmitting signaling configuring the UE for search space (SS) set group (SSSG) switching; and
processing PDCCH transmissions in accordance with one or more rules that account for the PDCCH repetition and SSSG switching, wherein one of the one or more rules dictates that whether the PDCCH repetition is applied depends, at least in part, on an active SSSG, wherein in response to two SS sets of paired PDCCH MOs being in a same SSSG, the PDCCH repetition is applied while the same SSSG is active.

20. The method of claim 19, wherein:
one of the rules dictates that paired SS sets of paired PDCCH MOs are to be included in a same SSSG together.

21. The method of claim 20, wherein a configuration in which paired SS sets of paired PDCCH MOs are not included in a same SSSG together is treated as an invalid configuration.

22. The method of claim 19, wherein:
one of the rules dictates that whether PDCCH repetition is applied depends, at least in part, on an active SSSG.

23. The method of claim 22, wherein another one of the rules dictates that at least one of overbooking, blind decoding counting, control channel element counting, a scheduling timeline, or hybrid automatic repeat request (HARQ) timeline depends, at least in part, on whether the UE monitors for single PDCCH or PDCCH with repetition in an active SSSG.

24. The method of claim 19, wherein:
in response to determining only one SS set of paired PDCCH MOs are in a same SSSG, the UE applies only single PDCCH monitoring while that SSSG is active.

\* \* \* \* \*